UNITED STATES PATENT OFFICE.

GEORGE H. MELLEN, OF NEW YORK, N. Y.

IMPROVEMENT IN ARTIFICIAL MARBLE.

Specification forming part of Letters Patent No. 134,300, dated December 24, 1872.

*To all whom it may concern:*

Be it known that I, GEORGE H. MELLEN, of New York, in the county of New York and in the State of New York, have invented certain new and useful Improvements in Artificial Marble; and do hereby declare that the following is a full, clear, and exact description thereof, reference being had to the accompanying drawing and to the letters of reference marked thereon making a part of this specification.

The nature of my invention consists in a new, cheap, and simple process of producing imitations of marble, as will be hereinafter more fully set forth.

In order to enable others skilled in the art to which my invention appertains to make and use the same, I will now proceed to describe the manner in which the same is or may be carried into effect, referring to the annexed drawing, which represents pieces of my imitation of marble.

In my process for producing imitations of marble I use any of the hydraulic or marble cements that will take a good polish and set quickly. The various colors designed to be used in imitating a certain piece of marble are mixed with the cement, each color in a separate vessel, to the consistency desired, which should be such as to admit of its being poured freely from a vessel provided with a small spout. I next use a smooth surface, either glass, wood, metal, or plaster of Paris, and pour the colors out of the spouted vessels upon said surface in small streams, in imitation of the veins of the marble that I desire to imitate. I then fill in between the veins and at such other points or places upon the slab or plate such other colors mixed with the cement as may be required. I next use a wind-blast and blow the colors until they flow as desired, the blast causing the colors to flow and mingle together in exact imitation of the mottled appearance of the marble.

The colors should be mixed with the cement in just such proportions and to such consistency as will allow of their flowing and mixing or mingling together in the desired manner, according to the strength of the blast used. If the colors are too thick for the blast they will not flow at all; or if too thin, they will flow into each other too much, and in either case will not produce the desired effect.

The wind-blast to intermingle the colors in the proper manner may be produced by an ordinary hand-bellows, or by machinery of any suitable description. The latter would be more preferable, as in this case the blast would at all times be more uniform than it could be with hand-bellows.

If finer or more delicate veins are desired than can be produced by pouring the cement upon a smooth surface, as above described, fine threads of silk or other material can be used for producing the veins, the threads to be dipped in the colors desired and then placed upon the smooth surface in such manner as may best imitate the veins desired to be produced. After the cement then has been poured on, the threads are to be drawn up through the cement by the projecting ends, the color of the thread being absorbed by the cement as the thread is drawn through, and producing the desired effect. After the veins and various colors are placed on the smooth surface, as described, the whole is smoothed over with a trowel or other suitable instrument, and pieces of brass, copper, or iron wire or rods, varying in size according to the size of the piece of marble or strength required, are placed upon the cement in any or all directions. If iron is used it should first be tinned or coated with zinc or asphaltum, or some other suitable material that will prevent oxidization. A sufficient quantity of cement is then added to give the marble the desired thickness.

In the annexed drawing, A represents the imitation of marble; *a a*, the rods; and B, the backing. This backing B may be made of an inferior grade of cement to the imitation A, and thereby reduce the cost.

In some cases I mix in the backing hemp, hair, or other loose fibrous material, for giving the desired strength.

Mosaics or other figures may be produced by placing pieces of marble on the smooth surface referred to, after having drilled or bored holes in the sides of said pieces, and then pouring the mixed color and cement between and all around the same, when the cement will enter the holes in the marble pieces and hold them in their positions.

If an exact imitation of the configuration of a certain piece of marble or other material is desired, a cast is made from plaster of Paris of said piece, and the inside of the cast coated with shellac and then oiled, when the colors and cement are poured in and mixed with the wind-blast in the same manner as above described for a smooth surface.

By the use of the wind-blast the colors are more naturally blended than can be done by any other process.

Having thus fully described my invention, what I claim as new, and desire to secure by Letters Patent, is—

1. An artificial marble constructed of a cement intermixed with a coloring material, poured, when in a semi-fluid state, upon a smooth surface and acted upon by an air-blast, which diffuses the particles of cement and coloring material, to imitate the natural marble, substantially as and for the purposes set forth.

2. An artificial marble constructed substantially as described, and faced upon a cement base provided with supporting cross-wires, substantially as herein set forth.

3. The combination of the cement facing, colored substantially as described, with the cement base, stayed, substantially as described, all as and for the purposes set forth.

In testimony that I claim the foregoing I have hereunto set my hand this 16th day of December, 1872.

GEO. H. MELLEN.

Witnesses:
C. L. EVERT,
A. N. MARR.